United States Patent
Lötters

(10) Patent No.: US 6,945,106 B2
(45) Date of Patent: Sep. 20, 2005

(54) MASS FLOWMETER

(75) Inventor: Joost Conrad Lötters, Gaanderen (NL)

(73) Assignee: Berkin B.V., Ruurlo (NL)

( * ) Notice: Subject to any disclaimer, the term of this patent is extended or adjusted under 35 U.S.C. 154(b) by 3 days.

(21) Appl. No.: 10/841,461

(22) Filed: May 10, 2004

(65) Prior Publication Data

US 2004/0261520 A1 Dec. 30, 2004

(30) Foreign Application Priority Data

May 13, 2003 (NL) .............................. 1023405
Mar. 2, 2004 (NL) .............................. 1025617

(51) Int. Cl.$^7$ .............................. G01F 1/68
(52) U.S. Cl. .............................. 73/204.26
(58) Field of Search .............................. 73/204.26, 204.27, 73/204.24; 324/703; 257/460

(56) References Cited

U.S. PATENT DOCUMENTS

| | | | |
|---|---|---|---|
| 4,558,342 A | * 12/1985 | Sclar .............................. 257/460 |
| 5,557,967 A | * 9/1996 | Renger .............................. 73/204.24 |
| 6,349,596 B1 | * 2/2002 | Nakada et al. .............................. 73/204.26 |
| 6,446,504 B1 | * 9/2002 | Maginnis, Jr. .............................. 73/204.27 |
| 6,550,325 B1 | * 4/2003 | Inushima et al. .............................. 73/204.26 |
| 6,777,961 B2 | * 8/2004 | Hamamoto et al. .............................. 324/703 |
| 2002/0011104 A1 | 1/2002 | Yamakawa et al. | |
| 2002/0043710 A1 | 4/2002 | Mayer et al. | |
| 2003/0056586 A1 | 3/2003 | Ueki et al. | |
| 2003/0115952 A1 | 6/2003 | Mayer et al. | |
| 2004/0025585 A1 | 2/2004 | Seki et al. | |

* cited by examiner

Primary Examiner—Max Noori
Assistant Examiner—Jewel V. Thompson
(74) Attorney, Agent, or Firm—Young & Thompson

(57) ABSTRACT

A mass flowmeter of the thermal type, having a planar, thin substrate with a sensing surface that can be brought into direct or indirect contact with a flowing fluid during a measurement, wherein electrically controllable heating elements and temperature sensor elements for determining a temperature difference are provided on the sensing surface by a planar technique. The substrate with its sensing surface is present in particular in a cavity of a module into which a feed line and a drain line for the fluid issue.

16 Claims, 3 Drawing Sheets

MASS FLOWMETER

BACKGROUND OF THE INVENTION

The invention relates to a mass flowmeter of the thermal type.

Various mass flowmeters operating by the thermal principle are known.

When a gas or liquid flow whose mass flowrate is to be measured passes as a laminar or turbulent flow through a flow tube, a boundary layer is formed along the inner wall of the flow tube. Local heating of the tube, for example by means of a resistance wire coiled around the tube, causes heat to be transmitted to the gas or liquid flow by heat conduction through the tube wall and the boundary layer. The effect of the supplied heat is determined. The thermal conductance of the tube is determined as a variable value that is dependent on the composition of the material and the quantity of heat transmitted through its surface, and the thermal conductance of the gas or liquid boundary layer is determined as a value related to the specific heat capacity in the fluid to be measured.

The heat conductance of the flow tube is thus calculated from data on its constituent material, tube dimensions, etc., on the one hand, while on the other hand the thermal conductance of the fluid is calculated from its density and flowrate. The flowmeter of conventional type may be used as a simple mass flowmeter capable of determining the mass flowrate of a fluid of a known type on the basis of the above operating principle without interfering with the flow of the fluid.

A known mass flowmeter of the thermal type is described, for example, in EP no. 01201156.5. This known mass flowmeter comprises a heat-conducting flow tube provided with an upstream and a downstream temperature sensor composed of resistance wire coiled around the tube, and a control circuit for keeping the temperature difference between the sensors constant, the mass flowrate of the fluid flowing through the tube being determined from data of the control circuit.

Disadvantages of such a measuring system with windings provided around a flow tube are that it is not suitable for measuring the flow highly locally, cannot measure very low flowrates, has a comparatively slow response, and cannot be used in small spaces.

SUMMARY OF THE INVENTION

The invention has for its object to provide a mass flowmeter which does not suffer from at least some of the above disadvantages.

According to the invention, a mass flowmeter of the thermal type for measuring the mass flow of a flowing fluid, comprising electrically controllable heating means and temperature sensor means for determining a temperature difference between symmetrical upstream and downstream positions, viewed in the direction of flow of the fluid, with respect to a chosen location, is characterized in that the flowmeter comprises a planar, thin substrate with a sensing surface that can be brought into direct or indirect contact with a flowing fluid, and in that the heating means and the temperature sensor means are provided on the sensing surface of the substrate by means of a planar technique.

In short: the invention provides a chip flow sensor.

An advantage of a chip flow sensor provided on a flat, thin substrate by a planar technique is that it can be made very small (with miniature dimensions) and has no windings that are to be arranged around a flow tube. This renders it possible to:

(a) measure very locally;

(b) measure much lower flowrates than is possible with conventional thermal sensors;

(c) obtain a faster response: a sensor on a small, thin substrate (membrane) registers a change in the flow much more quickly;

(d) make the instruments much smaller, so that the equipment in which they are used can also become smaller;

(e) use a mass manufacturing method ("micromachining"), by which hundreds of sensors can be manufactured in one operation, whereas each sensor is to be manufactured separately in the conventional method; and (f) measure in very small spaces (for example in microchannels).

The chip flow sensor's sensing surface may be provided, for example, with centrally located heating means flanked on either side by a temperature sensor. To compensate for the occurrence of a zero offset in such a system, the output signal of the sensor means may be electronically compensated.

A preferred embodiment of the mass flowmeter according to the invention, however, is characterized in that the heating means are composed of two parts which are symmetrically located, upstream and downstream, with respect to said chosen location and can be connected to electrical energizing means capable of energizing the two parts of the heating means in the absence of any flow such that the temperature sensor means register a zero temperature difference.

This preferred embodiment renders possible a so-called balanced heating. The balanced heating method solves the problem of an output signal (offset) being provided when there is no flow. Also: if there is no offset at zero flow, there can be no offset drift, so the zero point is super-stable! The latter is important for measuring over a wide range of flows: instead of 1:100 it is now possible to measure, for example, over an 1:10,000 range (so if the maximum capacity of the chip is 10 ln/min, a flow of 1 mln/min can still be measured, whereas this would be no better than 100 mln/min in the conventional situation).

BRIEF DESCRIPTION OF THE DRAWINGS

The invention will now be explained in more detail with reference to the drawing showing a few embodiments of the flowmeter according to the invention, wherein:

FIG. 4 shows a thin, planar carrier with two heaters and a thermopile in between;

DETAILED DESCRIPTION OF THE PREFERRED EMBODIMENTS

Figure 1:
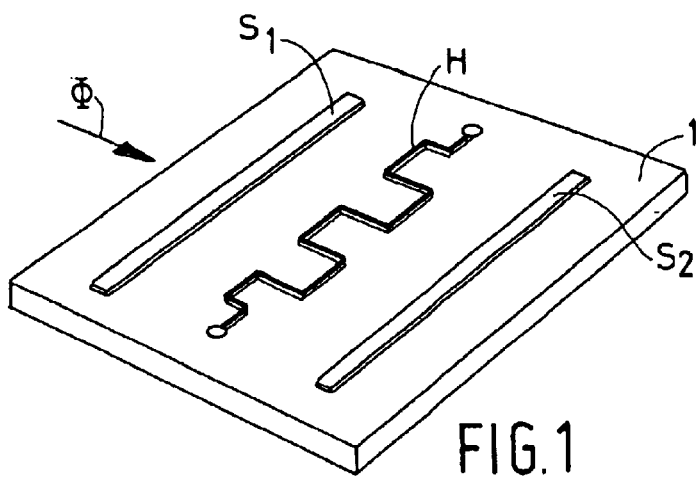
FIG. 1 shows a thin, planar carrier with a central heater flanked by two temperature sensors.

FIG. 1 shows a thin, flat carrier 1 over which a fluid can be passed in a direction $\phi$, with a central heater H and temperature sensors $S_1$ and $S_2$ arranged upstream and downstream symmetrically thereto. The flowrate can be determined by various methods with such an arrangement of the sensor elements. Any zero offset can be electronically compensated.

If the temperature sensors $S_1$ and $S_2$ are made of a temperature-sensitive resistance material, the zero offset can also be compensated in that it is measured which of the sensors $S_1$ and $S_2$ is the coldest and in that the respective one is heated up until it has the same temperature as the other one.

Figure 2A:
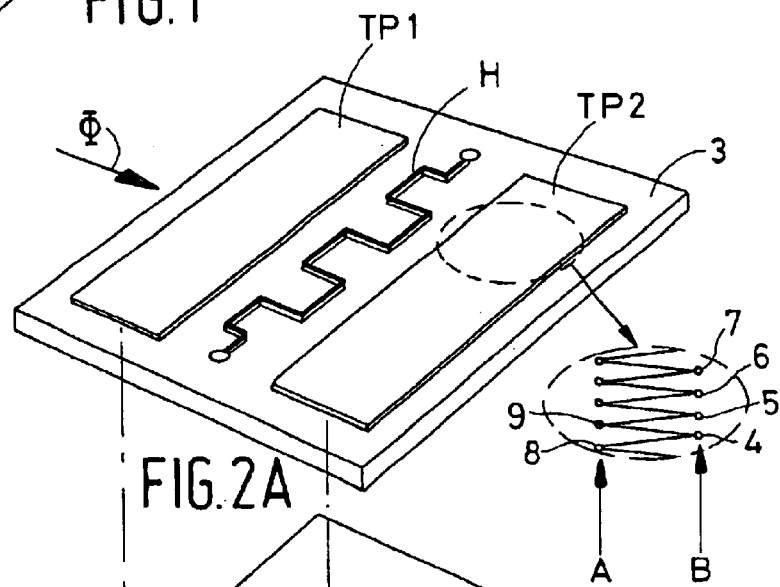
FIG. 2A shows a thin, planar carrier with a flow sensor configuration.
Figure 2B:
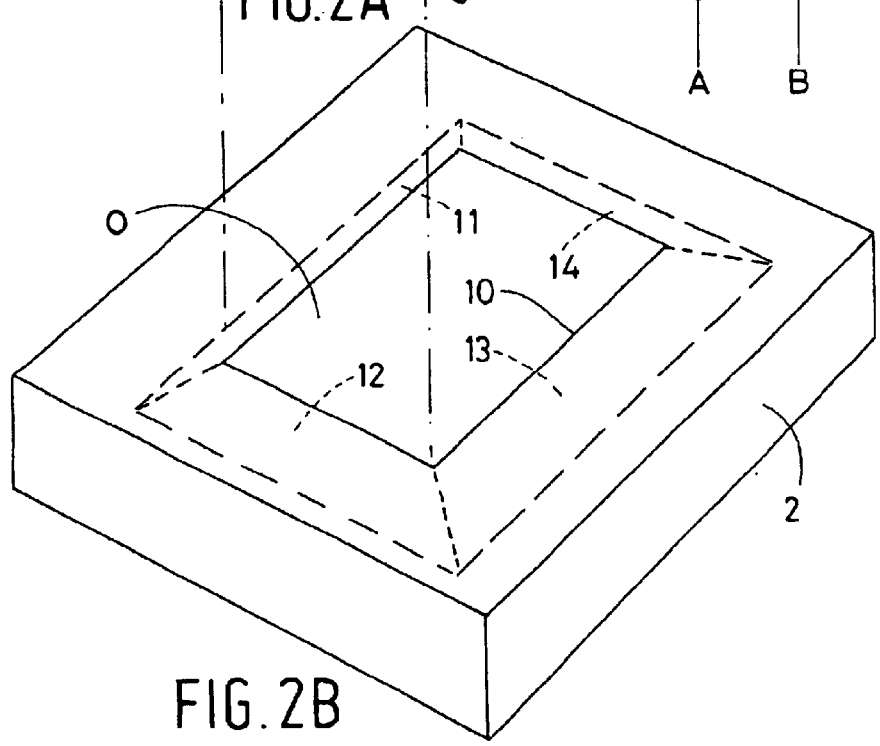
FIG. 2B shows a substrate provided with a hole designed for being combined with the carrier of FIG. 2A.

FIG. 2A shows a flat, thin carrier 3 with a central heater H. The latter is flanked by thermopiles $TP_1$ and $TP_2$. A thermopile may be regarded as a series arrangement of thermocouples, as can be seen in more detail in the inset. The thermopiles $TP_1$ and $TP_2$ have their "cold junctions" 4, 5, 6, 7, etc. at their sides facing away from the heater H and their "hot junctions" 8, 9, etc. at their sides facing the heater H. The thin substrate 3, which is made of a material having a low thermal conductivity, for example, of Pyrex or silicon nitride, is provided on a thicker base substrate 2 (FIG. 2B) of a material with good thermal conductivity, such as silicon. The base substrate 2 has a hole O that is bridged by the thin substrate 3. The dimensions of the hole O and of the thin substrate 3 and their mutual positions are such that the hot junctions of $TP_1$ and $TP_2$ lie above the hole O and the cold junctions 4, 5, 6, 7, etc. above the base substrate 2. As a result, the cold junctions of both thermopiles assume the substrate temperature and thus have the same temperature. This renders it possible to determine the temperature difference between their hot junctions.

The heater H and the portions of the thermopiles $TP_1$ and $TP_2$ should "see" as little as possible of the thick substrate 2. Preferably, therefore, the walls 11, 12, 13, and 14 of the hole O taper in upward direction, i.e. towards the surface on which the thin substrate 3 will rest. If so desired, further thermopiles (not shown) may additionally be present and be positioned such that their hot junctions lie above the hole O and their cold junctions above the substrate.

Figure 3:
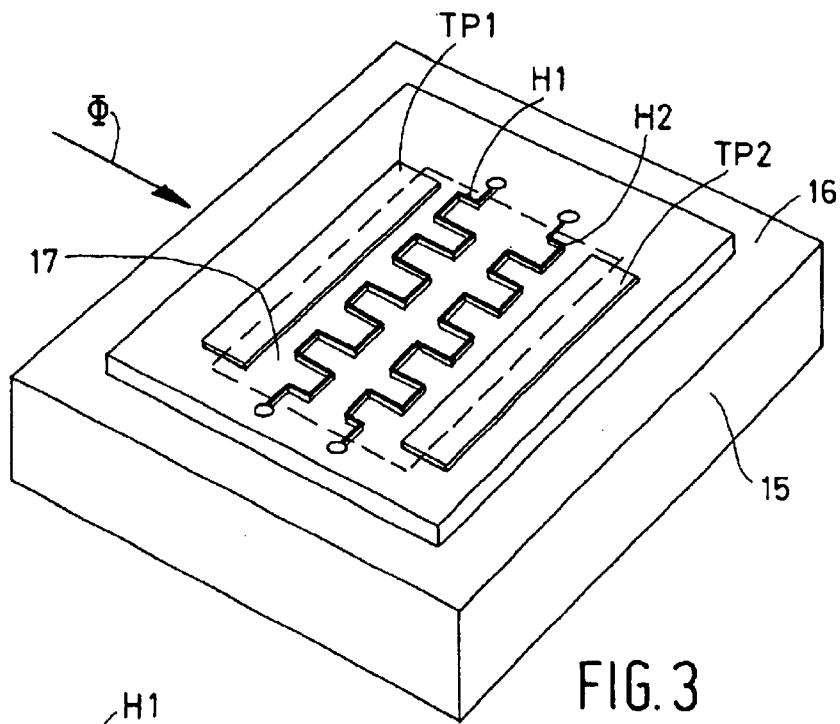
FIG. 3 shows a thin, planar carrier with a flow sensor configuration with balanced heating, mounted on a—thicker—substrate.

FIG. 3 shows a very interesting embodiment (flow sensor with balanced heating whose object it is to reduce the offset to zero, to be able to measure the flow from as close as possible from zero, and thus to achieve a wide dynamic measuring range, a high stability, and a high accuracy). A flat, thin plate or membrane 16 is supported by a thick substrate 15 which is provided with a hole 17, as was the substrate 2. The substrate 15 measures, for example, 3×6 mm. The active flow sensor elements, measuring, for example, 1×1 mm, are present on the membrane 16. Two heater elements $H_1$ and $H_2$ (with which the heat balancing can be achieved) are present centrally on the membrane 16 in this case. Two thermopiles $TP_1$ and $TP_2$ are arranged as temperature sensors on either side of the membrane, each with the hot junctions above the hole 17 and with the cold junctions above the substrate. The membrane 16 is made of Pyrex glass (thermal conductivity c. 1 W/mK) and has a thickness of c. 50 microns, but it may alternatively be made of, for example, silicon nitride with a thermal conductivity of 1 W/mK and a thickness of approximately 1 micron. The substrate 15 (the carrier of the chip) is made of silicon (thermal conductivity c. 150 W/mK) and has a thickness of c. 500 microns. A temperature difference may or may not arise on the membrane 16 between the hot junctions of the two thermopiles $TP_1$ and $TP_2$.

It is undesirable in the case of no flow for a temperature difference to arise. This may happen, however, inter alia owing to flaws in the chip manufacturing process. The offset at zero flow can be eliminated by means of the two heater elements $H_1$ and $H_2$ (heat balancing).

If there is a flow, it is desirable that the temperature difference should be a measure for the flow. A temperature difference can arise only if the membrane 16 is made of a material that is a bad thermal conductor (such as Pyrex) and if the membrane is comparatively thin (between 1 and 100 microns; additional advantage of a thin membrane: comparatively quick response of the sensor to a change in the flow). However, the cold junctions must have exactly the same temperature, which is possible only if the carrier of the chip is made of a material with good thermal conductivity (such as silicon) and is comparatively thick (between 100 and 1000 microns).

A disadvantage of the mass manufacture of the miniaturized flow sensors described above is that the thick (silicon) substrates may show considerable thickness differences from one sensor to the next. The heat drains off more quickly in a thicker portion than in a thinner portion. This leads to an imbalance or offset. This, however, is not constant, but dependent on the temperature or on the medium, and is accordingly difficult to compensate. The use of the balanced heating principle now renders it possible to eliminate the disadvantage of the thickness variations caused by the manufacturing process.

Figure 4:
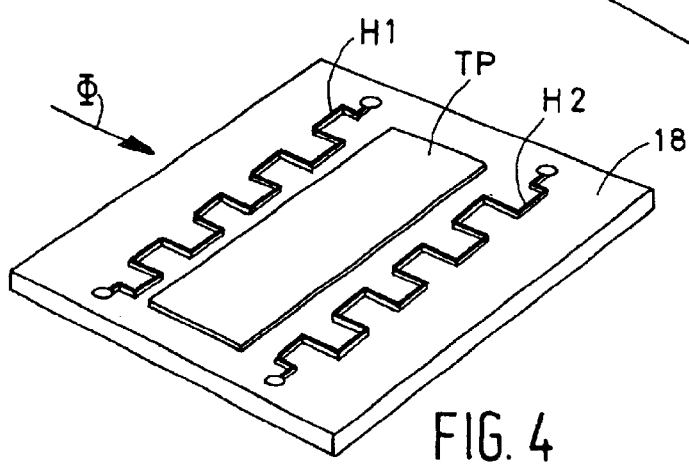

FIG. 4 shows a flow sensor configuration for measuring, for example, in accordance with the constant temperature (CT) or constant power (CP) method. FIG. 4 is a diagrammatic plan view of a thin planar carrier 18 of Pyrex on which heater/sensor elements $H_1$ and $H_2$ are provided. $H_1$ and $H_2$ may be provided in the form of, possibly meandering, conductor tracks. The temperature difference between the positions of $H_1$ and $H_2$ may be measured in various manners. In the present case a thermopile TP is provided between $H_1$ and $H_2$. An alternative in which TP is omitted is that $H_1$ and $H_2$ are made of temperature-sensitive resistance material and act at the same time as temperature sensors. The carrier 18 with the sensor components $H_1$ and $H_2$ (and TP) forms a chip flow sensor over which a flow to be measured can be passed in a direction $\phi$.

Figure 5:
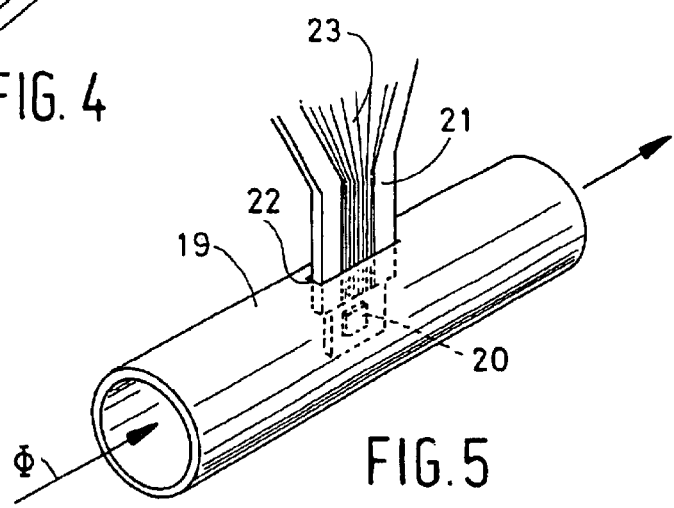
FIG. 5 shows a chip flow sensor suspended in a flow tube.

FIG. 5 shows a flow tube 19 through which a fluid can flow in an axial direction $\phi$ and in which a chip sensor 20 of the type described above is suspended with its sensing surface parallel to the axis. The sensor 20 may be mounted on support means, such as a pin, which means are passed through (an opening 22 in) the wall so that the measurement can take place highly locally inside a measuring line. The sensor 20 may be mounted on a foil with conductor tracks 23 or on a PCB 21 so as to provide an electrical connection possibility to control and measuring circuits. This latter embodiment of the flow sensor also renders measurements possible outside a flow tube, in any space whatsoever. The sensor components are preferably coated with a passivating layer as a protection against aggressive gases or vapors. This may be, for example, a thin layer of glass, Si nitride, or Si oxide.

Figure 6:
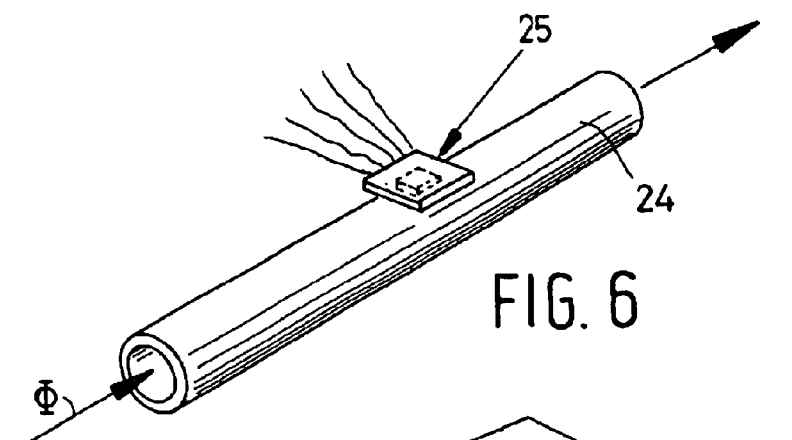
FIG. 6 shows a chip flow sensor mounted to the outside of a flow tube.

FIG. 6 shows a tube 24 through which a fluid can flow in an axial direction $\phi$ and on which a chip flow sensor 25 of a type as described above is fastened to the outer wall so as to be in heat-exchanging contact therewith (for example by means of gluing). This means that the sensor 25 faces the tube wall with its sensing surface carrying active sensor elements. The tube 24 may have a diameter of a few mm and be manufactured, for example, from stainless steel, PEEK, or fused silica. Among the advantages of this is that the sensor 25 does not come into contact with aggressive or corrosive liquids.

Figure 7:
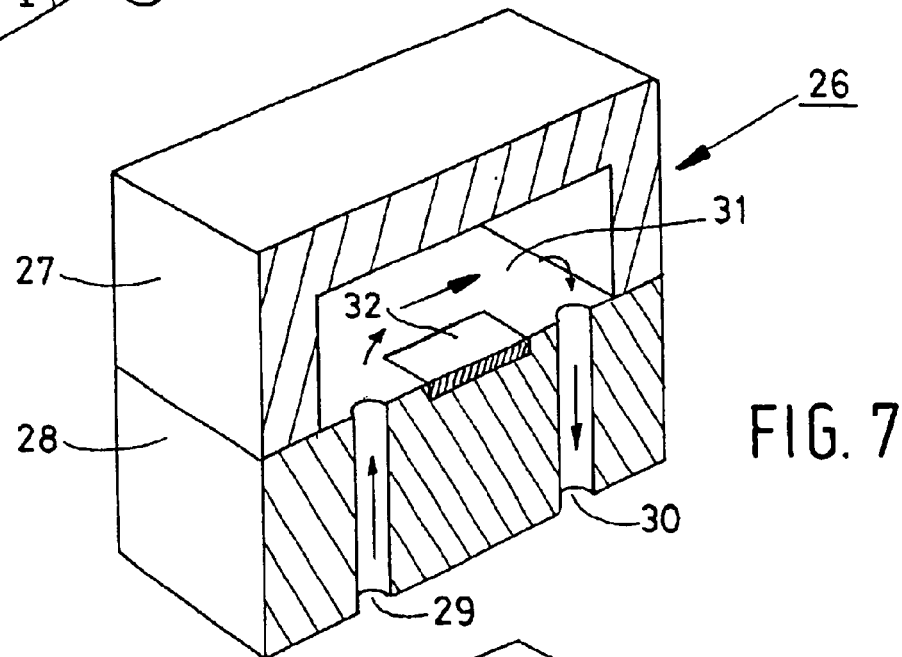
FIGS. 7 and 8 show measuring modules with chip flow sensors provided therein, partly in elevation and partly in cross-section.

FIG. 7 shows a measuring module 26 with a base part 28 comprising a feed line 29 and a drain line 30 for a flowing medium, partly in elevation and partly in cross-section. The lines 29 and 30 issue into a cavity formed within a cap 27 in which a chip flow sensor 32 is present. In this case the carrier of the active sensor elements of the sensor 32 forms part of the surface 31 of the base part 28, so that the sensor 32 disturbs the flow of the fluid as little as possible. An alternative arrangement is shown in FIG. 8.

Figure 8:
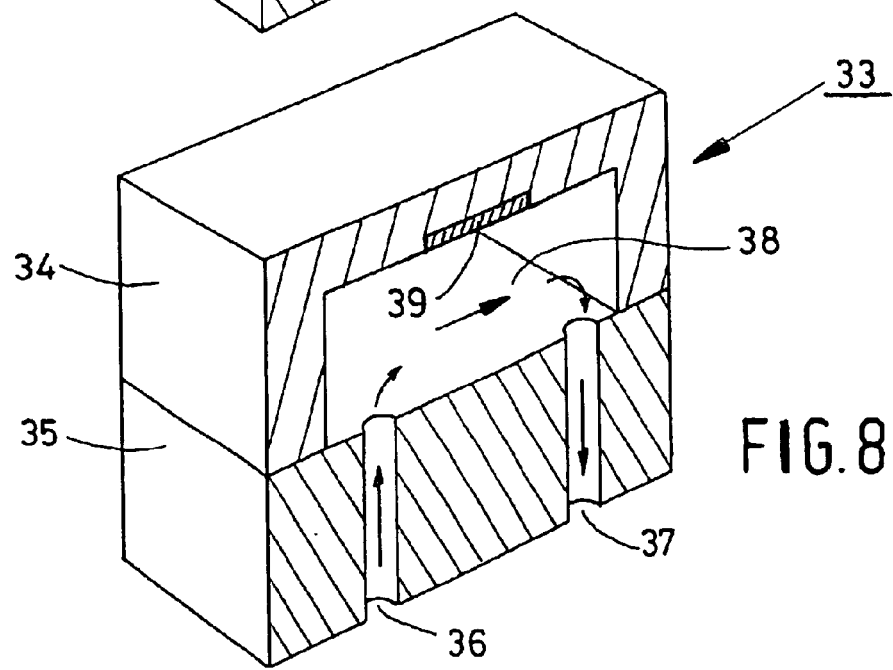

FIG. 8 shows a similar measuring module 33 with a base part 35, lines 36, 37, and a cap 34. Here a chip flow sensor 39 is recessed into the inner surface 38 of the cap 34 at the side facing the lines 36, 37. The flow sensor chips are positioned in all the above cases such that their active sensor means extend transversely to the direction of flow of the flowing medium.

Summarizing, the invention relates to a mass flowmeter of the thermal type, comprising a planar, thin substrate with a sensing surface that can be brought into direct or indirect contact with a flowing fluid during a measurement, wherein electrically controllable heating means and temperature sensor means for determining a temperature difference are provided on the sensing surface by a planar technique. The substrate with its sensing surface is present in particular in a cavity of a module into which a feed line and a drain line for the fluid issue.

What is claimed is:

1. A mass flowmeter of the thermal type for measuring the mass flow of a flowing fluid, comprising:
   a planar, thin first substrate with a sensing surface that can be brought into direct or indirect contact with a flowing fluid;
   an electrically controllable heating means on said sensing surface; and
   a temperature sensor means on said sensing surface for determining a temperature difference between symmetrical upstream and downstream positions, viewed in the direction of flow of the fluid, with respect to a chosen location,
   wherein said heating means are composed of two parts which are symmetrically located, upstream and downstream, with respect to said chosen location and are connectable to electrical energizing means capable of energizing said two parts of the heating means in the absence of any flow to adjust the temperature sensor means to register a zero temperature difference.

2. The mass flowmeter as claimed in claim 1, wherein the temperature sensor means comprise two temperature-sensitive resistors.

3. The mass flowmeter as claimed in claim 1, wherein the temperature sensor means comprise at least one thermopile.

4. The mass flowmeter as claimed in claim 1, wherein the flowmeter comprises a measuring module adapted for allowing a fluid to flow through, and wherein the sensing surface of the first substrate forms part of a wall surface of said measuring module.

5. The mass flowmeter as claimed in claim 1, wherein the flowmeter comprises a measuring module adapted for allowing a fluid to flow through, and wherein said first substrate is provided on an inner surface of said measuring module.

6. The mass flowmeter as claimed in claim 4, wherein the measuring module comprises a cavity into which a feed opening and a drain opening for the flowing fluid issue, in which cavity the sensing surface is provided.

7. The mass flowmeter as claimed in claim 5, wherein the measuring module comprises a cavity into which a feed opening and a drain opening for the flowing fluid issue, in which cavity the sensing surface is provided.

8. The mass flowmeter as claimed in claim 1, wherein the flowmeter comprises a measuring line adapted for allowing a fluid to flow through, and wherein the first substrate is suspended in said measuring line.

9. The mass flowmeter as claimed in claim 1, wherein the flowmeter comprises a measuring line adapted for allowing a fluid to flow through, and wherein the first substrate is fastened against the outer wall of said measuring line so as to be in heat-exchanging contact therewith.

10. The mass flowmeter as claimed in claim 1, wherein the planar, thin first substrate is a membrane made of a first material with low thermal conductivity.

11. The mass flowmeter as claimed in claim 10, further comprising a second substrate having a thickness greater than said first substrate and made of a second material with a thermal conductivity higher than that of said first material and having a hole over which said membrane is placed, wherein the temperature sensor means comprise two thermopiles formed on said membrane on respective sides of the heating means with their hot junctions above the hole and their cold junctions above the second substrate.

12. The mass flowmeter as claimed in claim 11, wherein the heating means are composed of two parts which are placed at a short distance from one another and parallel to one another centrally on the membrane.

13. The mass flowmeter as claimed in claim 1, wherein in the presence of flow, the temperature sensor means register a temperature difference which is representative of the flow, whereby a thermal flow measurement is achieved.

14. A mass flowmeter of the thermal type for measuring the mass flow of a flowing fluid, comprising:
   a planar, thin first substrate with a sensing surface that can be brought into direct or indirect contact with a flowing fluid;
   an electrically controllable heating means on said sensing surface; and
   a temperature sensor means on said sensing surface for determining a temperature difference between symmetrical upstream and downstream positions, viewed in the direction of flow of the fluid, with respect to a chosen location,
   wherein the heating means are composed of two parts which are placed at a distance from one another and parallel to one another, and
   wherein the temperature sensor means comprise a thermopile that is situated between said two parts of the heating means.

15. A mass flowmeter of the thermal type for measuring the mass flow of a flowing fluid, comprising:
   a planar, thin first substrate with a sensing surface that can be brought into direct or indirect contact with a flowing fluid;
   an electrically controllable heater on said sensing surface;
   a temperature sensor on said sensing surface for determining a temperature difference between symmetrical upstream and downstream positions, viewed in the direction of flow of the fluid, with respect to a chosen location; and a second substrate having a thickness greater than a thickness of said first substrate and having a hole, said first substrate being placed over said hole, wherein said first substrate has a thermal conductivity lower than a thermal conductivity of said second substrate, wherein said temperature sensor comprises two thermopiles on respective sides of the heater with respective hot junctions above the hole and respective cold junctions above said second substrate, and wherein said respective cold junctions have a same exact temperature, so that a difference between a voltage of said respective hot junctions represents a temperature difference of said respective hot junctions.

16. The mass flowmeter as claimed in claim 15, wherein a thermal conductivity of said first substrate is about 1 W/mK and a thermal conductivity of said second substrate is about 150 W/mK.

* * * * *